United States Patent [19]

Abel

[11] Patent Number: 5,063,807

[45] Date of Patent: Nov. 12, 1991

[54] SAW SUCH AS A JIG SAW OR SCROLL SAW

[76] Inventor: Helmut Abel, Monte Carlo Sun, 74, Bd. d'Italie, Monaco, 98000

[21] Appl. No.: 557,760

[22] Filed: Jul. 26, 1990

[30] Foreign Application Priority Data

Jul. 28, 1989 [DE] Fed. Rep. of Germany ....... 3925008

[51] Int. Cl.⁵ .......................... B26D 7/26; B27B 11/08
[52] U.S. Cl. ...................................... 83/647; 30/393;
74/40; 83/747; 83/783
[58] Field of Search ...................... 83/647, 647.5, 628,
83/753, 754, 755, 757, 758, 759, 760, 769, 777,
778, 775, 783, 784, 747, 786; 30/393; 74/40

[56] References Cited

U.S. PATENT DOCUMENTS

| 1,023,079 | 4/1912 | Haines | 83/754 |
| 1,147,063 | 7/1915 | Wilson | 83/760 |
| 4,240,204 | 12/1980 | Walton, II et al. | 30/393 |

FOREIGN PATENT DOCUMENTS 343370 10/1921 Fed. Rep. of Germany .
88-8046 10/1988 Fed. Rep. of Germany .
3722524 1/1989 Fed. Rep. of Germany .

Primary Examiner—Mark Rosenbaum
Assistant Examiner—Kenneth E. Peterson
Attorney, Agent, or Firm—Eugene E. Renz, Jr.

[57] ABSTRACT

The invention pertains to a saw, in particular to a jig saw or scroll saw, with a saw blade which is driven by a force acting on a parallelogram of rods. A saw blade is attached to a connecting shank which joins two longitudinal side arms. The two longitudinal side arms are designed to move in their longitudinal direction. On at least one of the two longitudinal side arms a guide element in the form of, for example, a turning roller, is positively guided against a stationary guide surface which is at an angle, preferablye an acute angle, to the connecting shank. As a result of this positive guidance, the backward movement of the saw blade from the cut edge during the return stroke is reduced to a desired value. Thus a jig saw of small size, but with a large stroke, can be realized in which the saw blade is guided parallel to the cut edge at all times but is moved back by a small amount from the cut edge during the return stroke.

10 Claims, 1 Drawing Sheet

SAW SUCH AS A JIG SAW OR SCROLL SAW

FIELD OF THE INVENTION

The present invention relates to improvements in saws, such as jig saws and scroll saws

BACKGROUND OF THE INVENTION

In conventional jig saws, the saw blade is usually moved back and forth along its longitudinal axis by means of a working rod. In conventional orbiting saws, a tilting motion is imposed on the saw blade during the working stroke to increase the cutting performance and, as a consequence, the saw teeth, particularly those near the tip of the saw blade, penetrate more deeply into the material to be sawed due to their slanted orientation.

These arrangements have certain additional disadvantages and drawbacks. For example, in conventional jig saws with a linear-motion saw blade, the backs of the cutting teeth are pressed into the material being sawed each time the blade makes its return stroke. Consequently, the saw blade can quickly dull, especially, if during the return stroke, the backs of the sensitive saw teeth are hammered against the cut edge of a hard material, such as metal. Furthermore, a great deal of force is expended and the operation of the saw runs are very irregular.

Conventional orbiting saws suffer additional disadvantages. For example, the orbiting saw blade is not guided perpendicularly to the cutting edge at all times. Instead, the saw blade is forced into a slanted position before each working stroke, thus impairing the accuracy of the cut.

In addition to linear-motion and orbiting jig saws, there also are jig saws that are driven by means of a cam via a parallelogram of rods. One such cam driven jig saw is demonstrated by the West German Patent No. 2,334,911 (FIGS. 5–7 in particular). Even in this type design where the saw blade is lifted off the cutting edge during the return stroke, a considerable amount of backward motion (backstroke) is caused during the return stroke. This is especially so when the rods of the parallelogram are short. Conversely, during the working stroke the amount of forward movement (forestroke) is large, which leads to heavy wear on the saw blade and can even lead to an overload on the drive. A large forestroke and backstroke impairs not only the cutting performance, but the ability to negotiate curves which precludes the cutting of smaller radii. Although this problem can be solved by increasing the length of the two parallel longitudinal side arms of the parallelogram of rods, this produces an undesirable increase in the overall dimensions of the saw, impairing the use as a machine-driven hand tool. In addition, a small working stroke results in a poor cutting performance.

SUMMARY OF THE INVENTION

With the foregoing in mind, it is object of the present invention to provide an improved saw which is driven by a cam via a parallelogram of rods and which has novel features of construction and arrangement which eliminates the above described disadvantages in such a way that the backstroke and forestroke are reduced, and a powerful cutting action is provided in a relative compact machine. Simultaneously, the length of the working stroke (up and down travel) of the saw blade is increased considerably.

In the present invention, the advance of the saw blade during the working stroke, and the backward motion of the saw blade during the return stroke are not determined by the geometry of the parallelogram of rods, but rather by the movement of at least one, preferably circular, guide element along a fixed guide surface, which surface is preferably at an acute angle to the connecting shank joining the two longitudinal side arms of the parallelograms of rods. The slant of the guide surface is preferably selected so that a backward and forward motion of between 0.5 to 2 mm is obtained. To ensure the necessary back and forth motion of the whole parallelogram of rods during the working stroke and the return stroke, the two longitudinal side arms are designed to be moveable in their longitudinal direction. Because of the positive guidance of the parallelogram of rods, the forward motion of the saw blade during the working stroke and the backward motion of the saw blade during the return stroke can be limited to the desired extent. The preferred motion is near the range of 1 mm.

In the present invention, the longitudinal side arms can be supported rotatably in a common pillow block, which block is itself free to move toward the cutting edge. By this arrangement, the guide element exerts pressure on the inclined guide surface by way of a spring, such as a helical compression spring, which in turn acts on the pillow block.

A second alternate design for the present invention permits the guide element to be guided on both sides between parallel guide surfaces within a recess of a fixed guide yoke. When the slant of the guide yoke, and thus the angle of the two guide surfaces relative to the connecting shank, is designed to be adjustable, it becomes easy to adjust the forward and backward range of motion of the saw blade.

A third alternate design of the present invention permits each of the longitudinal side arms to be guided by way of its own guide element in conjunction with an associated guide surface. Thus, suspension of the longitudinal side arms in separate stationary, rotating pivot bearings is possible, and a common movable pillow block can be dispensed with. In accordance with this third alternative, the two longitudinal side arms are designed to telescopically extend.

Depending on its intended use, the saw can be utilized either as a stationary machine with a upward-facing worktable and upward-pointing saw blade, or as a portable hand carried tool with a downward-pointing saw blade, i.e. a hand jig saw. For use as a jig saw, the saw blade is preferably attached by way of a quick release coupling which projects out from one side of the saw housing. It is also possible to provide means for clamping the blade at both ends so that the saw can be used as a high-precision scroll saw. To this end, either: (A) the connecting shank can be designed as a U-shaped yoke, between the two shanks of which the saw blade is clamped; or (B) the saw blade can be clamped directly between the spread-apart longitudinal side arms, so that the connecting shank can be eliminated altogether.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
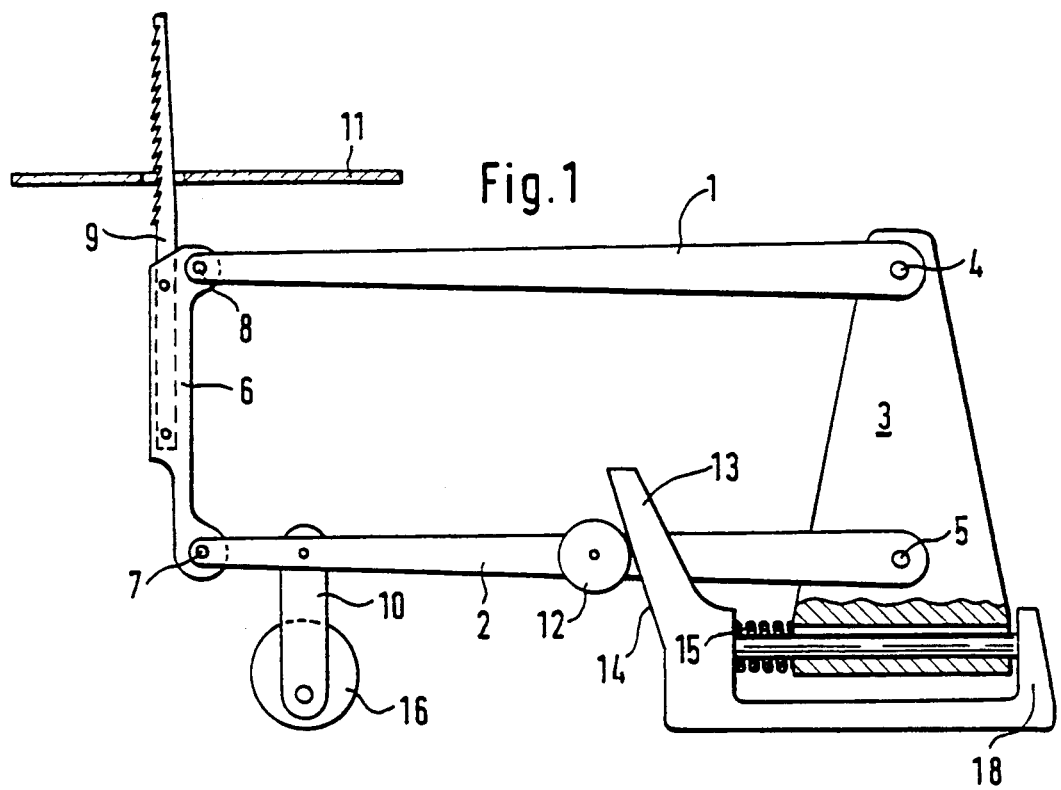
FIG. 1 is a side elevational view of a jig saw showing the preferred embodiment of the present invention.

Referring now to the drawings, and particular FIG. 1 thereof, there is shown a jig saw made in accordance with the present invention. The saw comprises a saw blade (9), driven by a cam (16) acting by way of a parallelogram of rods (1, 2, 6). The parallelogram of rods includes two parallel longitudinal side arms (1, 2) which are connected at one end to a common pillow block (3) at separate pivot bearings (4, 5), and are pivotally connected at the other end to a connecting shank (6) at separate pivot points (7, 8). A quick release holder (not shown in detail) is provided to hold the saw blade (9) on the connecting shank (6). In FIG. 1, the jig saw is illustrated as a stationary machine so that the saw blade (9) projects through an opening (11a) from underneath a workpiece supporting worktable (11). The cam (16) which is provided to drive the jig saw, is connected to the lower longitudinal side arm (2) by way of a camshaft (10).

Alternatively, the saw blade (9) can be clamped at both ends (not shown) for use as a high-precision scroll saw. For this purpose, either: (A) the connecting shank (6) is designed as a U-shaped yoke in which the saw blade (9) is clamped between the shanks of the U-shaped yoke; or (B) the connecting shank (6) is eliminated entirely and the saw blade (9) is clamped directly to the ends of the longitudinal side arms (1, 2). In alternative (B), the longitudinal side arms (1, 2) are spread apart, by for example, a spindle tightener, which engages with, and connects, the ends of the longitudinal side arms (1, 2) projecting beyond the pivot bearings (4, 5). In this case the saw blade (9) itself forms the connecting shank of the parallelogram of rods.

In FIG. 1 as shown, a rotating roller guide element (12) is provided on the lower longitudinal side arm (2) approximately mid-way between the pivot bearing (5) and pivot point (7). This guide element (12) can also alternatively be designed either as a fixed or rotating stud. The peripheral surface (12a) of guide element (12) rests on a flat guide surface (14) of a fixed guide body (13). The guide surface (14) is located at an acute angle (alpha) to the axis of the connecting shank (6).

The common pillow block (3), on which the parallelogram of rods (1, 2, 6) is supported, is guided in such a way that it can constantly move backwards and forwards in the horizontal direction. The lower end of the pillow block (3) is penetrated by at least one guide rod (19) which extends through a bore (23) in the pillow block (3). The guide rod (19) is arranged inside a fixed, U-shaped yoke (18), one shank of which continues to become guide body (13). In the embodiment illustrated, the guide body (13) is an integral extension of the yoke (18). A precompressed helical spring means (15) is located on the guide rod (19) between the pillow block (3), and the yoke (18). The precompressed helical pressure spring (15) acts through the parallelogram of rods to press guide element (12) against the guide surface (14).

Consider now the operation of the present invention jig saw. When the rotation of the cam (16) moves the parallelogram of rods (1, 2, 6) from bottom dead center to top dead center (the return stroke) the saw blade (9) is moved backward (the backstroke) a certain distance from the cut edge of the material to be cut. When the rotation of the cam (16) next moves the parallelogram of rods (1, 2, 6) from top dead center to bottom dead center (the work stroke), the saw blade (9) is pushed forward (the forestroke) a certain distance toward the cut edge of the material to be cut which is both equivalent to, and parallel to, the backstroke. The amount of this forward and backward movement is predetermined by the positive guidance of guide element (12) on slanted guide surface (14). The slant of guide surface (14) is selected so that the backward movement, is decreased to a technically ideal value of about 1 mm.

During the return stroke, the entire parallelogram (rods (1, 2, 6) and pillow block (3)) shifts toward the cutting edge, overcoming the pressure of the precompressed helical pressure spring (15). During the working stroke, the entire parallelogram (rods (1, 2, 6) and pillow block (3)) retreats from the cutting edge, under the action of the precompressed helical pressure spring (15). As a result, the significant degree to which the parallelogram is shortened during the upward movement is partially compensated by the simultaneous forward motion of the entire parallelogram (rods (1, 2, 6) and pillow block (3)) toward the cutting edge, so that only a slight backward movement results which depends on the slant of the guide surface (14).

Figure 2:
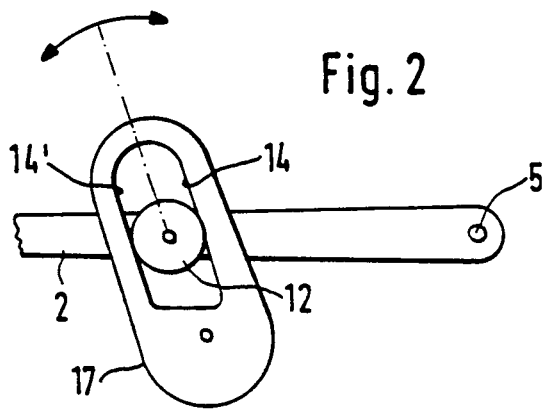
FIG. 2 is an enlarged fragmentary view of a section of a longitudinal side arm of the jig saw showing the second embodiment of guide means.

In accordance with a modified embodiment of the present invention as shown in FIG. 2, the guide element (12), in the form of a turning roller, is guided between two parallel guide surfaces (14, 14') within a recess of a stationary guide yoke (17). In this embodiment, the guide element (12) rests with only a slight clearance on both sides against the parallel guide surfaces (14, 14'), so that no spring element is required to press the guide element (12) against the guide surface (14). The angle of the guide yoke (17) relative to the connecting shank (6) is preferably adjustable so that the amount of forward and backward movement of the parallelogram of rods (1, 2, 6) can be set to the desired value by adjusting this angle.

Figure 3:
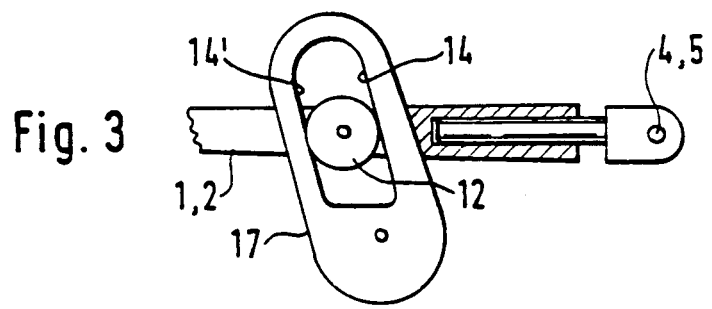
FIG. 3 is an a enlarged fragmentary view of a section of a longitudinal side arm of the jig saw showing the third embodiment of guide means.

In accordance with a further alternate embodiment of the present invention as shown in FIG. 3, the guide yoke arrangement shown in FIG. 2 may be incorporated on each of the two longitudinal side arms (1, 2). Further, the pillow block (3) may be eliminated by having the longitudinal side arms (1, 2) extend in a telescoping manner between their respective guide yokes (17) and respective pivot bearings (4, 5). More specifically, the configuration comprises of an elongated opening chamber (21) on one end of each outer end longitudinal side arm (1, 2), and a push rod (22) which is mounted in the chamber (21) which connects to the pivot bearings (4, 5). In accordance with this embodiment, when it is desired to adjust the angle of the guide yoke arrangements, it is imperative that both guide yokes be positioned at the same angle in relation to each longitudinal side arm (1, 2).

All particular embodiments of the present invention that have been illustrated and described herein, are not intended to limit the invention, and changes and modifications may be made therein within the scope of following claims.

What is claimed is:

1. A saw for cutting material at a cut edge, comprising:

a drive means;

a parallelogram of pivotally connected rods including two longitudinal side arms adapted for movement in a longitudinal direction, and a saw blade pivotally connected to one end of one of the longitudinal side arms and disposed in a predetermined axis;

a cam means connected to at least one of the longitudinal side arms and driven by the drive means to effect reciprocating movement of the saw blade in an arc via the longitudinal side arms, through a cycle consisting of a work stroke and a return stroke whereby the saw blade is displaced a lateral distance relative to the cut edge;

at least one fixed member having at least one guide surface disposed at a predetermined angle relative to the predetermined axis of the saw blade;

at least one guide element connected to at least one of the longitudinal side arms cooperatively engaging and moving relative to said guide surface during the reciprocating movement of the saw blade thereby limiting the lateral distance of said blade to a predetermined small displacement during its cycle.

2. A saw according to claim 1, characterized in that the two longitudinal side arms are supported rotatably on a pillow block which is free to move longitudinally; and in that the pillow block is subjected to the force of a spring so that the at least one guide element is pressed against the at least one guide surface.

3. A saw according to claim 1, characterized in that the guide element is guided on both sides between two parallel guide surfaces inside a recess in a stationary guide yoke.

4. A saw according to claim 3, characterized in that the two longitudinal side arms are supported in separate stationary pivot bearings and are extensible in a telescoping manner between the guide elements and the pivot bearings with each of the guide elements being guided on both sides between two parallel guide surfaces.

5. A saw according to claim 1, characterized in that the predetermined angle of the guide surface is adjustable.

6. A saw according to claim 1, characterized in that the saw is designed as a portable, hand guided device.

7. A saw according to claim 1, characterized in that the saw blade is clamped at both ends.

8. A saw according to claim 1, characterized in that the lateral distance is in the range of 0.5–2.0 mm.

9. A saw according to claim 1, characterized in that the guide element is designed as a circular, preferably rotating, roller.

10. A saw according to claim 1 wherein said saw is adapted for curvature cutting.

* * * * *